United States Patent Office 3,589,879
Patented June 29, 1971

3,589,879
DEVICE FOR SUPPLYING GLASS MELT FROM THE FEEDER OF A GLASS FURNACE INTO THE GLASS FIBER FORMATION ZONE
Petr Grigorievich Yantsev, Otkrytie shosse 3, korpus 1, kv. 67; Alexandr Mikhailovich Prokhorov, Bazovskaya ulitsa 22, kv. 72; Sergei Sergeevich Kutukov, 1 Nizhne-Likhoborsky proezd 16, kv. 45; Nikolai Pavlovich Koninin, Kurbatovsky pereulok 48, korpus 5, kv. 6; Antonina Nikolaevna Zolotova, Flotskaya ulitsa 94, kv. 57; and Rafail Grigorievich Chernyakov, Ulitsa Marshala Birjuzova 21, kv. 7, all of Moscow, U.S.S.R.; Stanislav Fedorovich Andreev, GOZSV 1, kv. 30; Viktor Petrovich Novikov, GOZSV 2, kv. 10; and Ljudmila Vladimirovna Tsyrina, GOZSV 1, kv. 72, all of Krjukovo Moskovskoi Oblasti, U.S.S.R.; and Nikolai Evgenievich Koslov, Oktyabrskaya 14-a, Skhodnya Moskovskoi Oblasti, U.S.S.R.
Filed Apr. 25, 1969, Ser. No. 819,319
Int. Cl. C03b 37/02
U.S. Cl. 65—11
1 Claim

ABSTRACT OF THE DISCLOSURE

This invention pertains to an apparatus for forming glass fibers in which there is a furnace for supplying molten glass to a plurality of nozzle feeders spaced from the furnace. Molten glass is fed through a thermally insulated metal tube that connects the bottom of a furnace feeder with the nozzle feeder in which each of these is fitted with a metal tube with the thermally insulated tube between these metal tubes. A current conducting heating member is fitted onto the furnace feeder and another on the throat in the inlet to the nozzle feeder.

---

Figure 1:
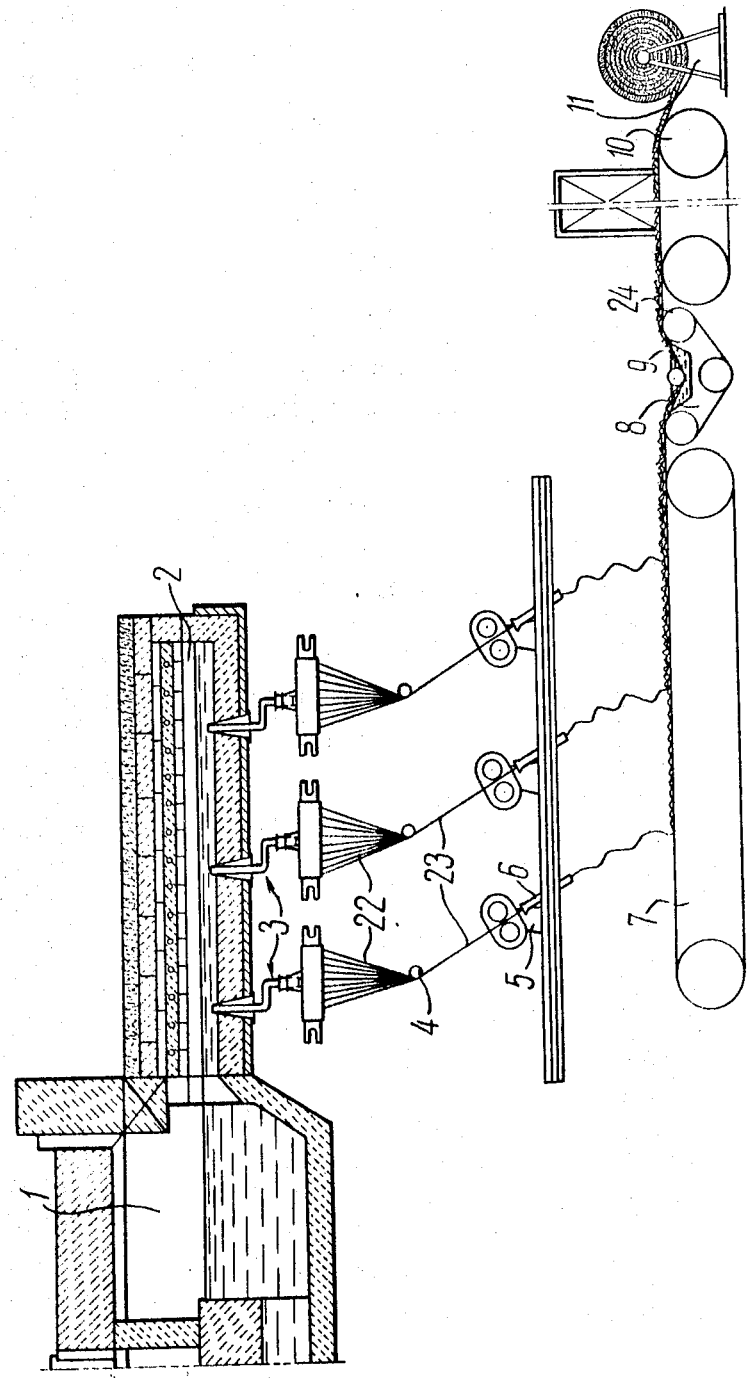

The present invention relates to a device for feeding glass melt from a feeder of glass furnace into the glass fiber formation zone in installations adapted to produce glass fibers, glass wool, glass cloth and similar materials.

Known in the art are devices of the type described provided with a nozzle feeder made of a platinum-rhodium alloy, which nozzle feeder member is fixed directly to the bottom of the glass furnace feeder, and with a ceramic sleeve fitted into the feeder bottom and defining a channel for the glass melt exit from the feeder.

In the process of operation of such devices, the temperature of the glass melt supplied into the nozzle feeder cannot be adjusted. Nonisothermal flows of the glass melt originating in the nozzle feeder disturb stable thermal conditions of its operation, which results in a non-uniform distribution of the glass melt temperature in the bottom portion of the feeder. The streams of the glass melt outflowing from the nozzle orifices feature different viscosities, whereby the fibers produced therefrom at a constant rate of drawing prove to be of different diameters, this adversely affecting the quality of the glass filaments formed from such fibers.

Due to the corrosion of ceramic sleeves, walls and bottom of the feeder the glass melt becomes fouled and therefore when delivered directly in the nozzle feeder results in fibers whose chemical composition features non-similarity. Moreover, shaping of fibers from thermally and chemically dissimilar glass melt is conducive to an increase of fiber breakability in the formation zone, the manufacturing process becoming thus discontinued.

In the devices known heretofore the glass melt is thermally prepared directly in the feeder. Therefore for obtaining the viscosity of the glass melt required for shaping fibers the feeder should be of a great capacity which involves an increase in the consumption of noble metals such as platinum-rhodium alloy employed for making the feeder and in high consumption of electric power to compensate thermal losses thereof.

It is an object of the present invention to eliminate said disadvantages.

It is a specific object of the present invention to provide such a device for supplying glass melt from the feeder of a glass furnace into the glass fiber formation zone that will ensure the continuity of the formation process with a high quality of the glass fiber obtained due to the stabilization of the thermal conditions of its operation and to the fact that the glass melt supplied into the nozzle feeder is both thermally and chemically uniform. Moreover, the device of the present invention is to be light in weight, compact, reliable in operation, is to feature long service life and convenience in operation.

Said object is accomplished due to the fact, that in a device for supplying the glass melt from the feeder of a glass furnace into the glass fiber formation zone according to the invention the feeder is somewhat spaced from the glass furnace feeder bottom and is connected therewith by means of a thermally insulated metal tube, the latter being provided with at least two electric means for maintaining the glass melt temperature required for producing glass fibers, each of said means being equipped with a metal tube connected with said first-mentioned thermally insulated tube and enclosed in a current-conducting bushing member; one of said means is fitted into the furnace feeder bottom and the other is freely arranged in the nozzle feeder throat with a clearance between said throat and the current-conducting bushing member.

The herein-disclosed device ensures the continuity of the fiber manufacturing process, the daily output being 300 to 350 kg. of glass fibers.

The glass melt obtained from the feeder with the use of the present device is chemically and thermally uniform, the temperature of the glass melt being adjustable over the length of the nozzle feeder which is also favorable for reducing the breakability of fibers in the process of forming.

The device proposed herein consumes 1.5–3.0 less electric power than similar devices known heretofore. The amount of the platinum-rhodium alloy required for its manufacture is 1000 to 1300 g. less. The present device is compact and a number of nozzle feeders that can be arranged on the glass furnace feeder is 2 to 4 times greater than that possible hitherto.

Figure 2:
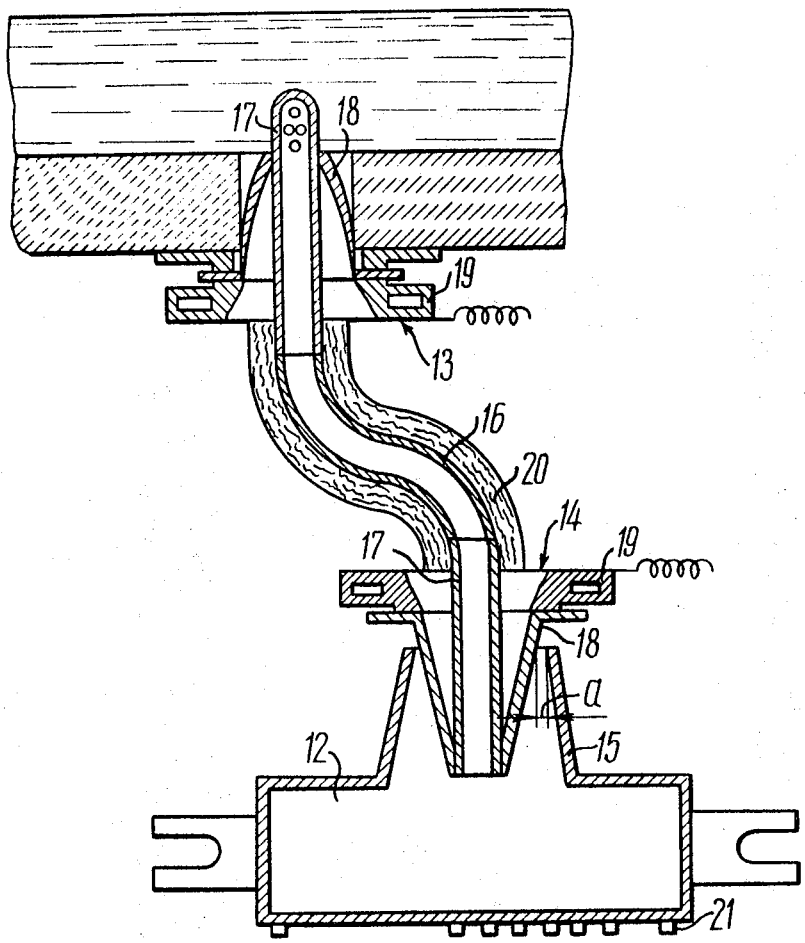

In what follows the invention is illustrated by an exemplary embodiment of the device according to the invention with reference to the accompanying drawings, wherein:

FIG. 1 is a diagrammatic side view of an installation for producing glass cloth from glass fibers obtained from glass melt, illustrating a section taken through the exit portion of the glass furnace and the feeder including the device of the present invention; and FIG. 2 is a longitudinal section view of the device for supplying glass melt from the feeder into the glass fiber formation zone.

The installation presented in the drawings comprises a glass furnace 1 (FIG. 1), a furnace feeder 2, a plurality of means 3 for supplying glass melt from the furnace feeder 2 into the glass fiber formation zone (three such means being conventionally shown in the figure), filament collectors 4, mechanisms 5 for drawing threads equipped with air-operated thread traversers 6 to produce glass cloth, a doffing conveyer 7, a conveyor 8 with a bath 9 for impregnating the cloth, a drying conveyer 10 and a receiving means 11.

Each of the means 3 consists of a nozzle feeder 12 (FIG. 2), two electric means 13 and 14 for maintaining the glass melt temperature required for shaping glass fibers, of which the upper means 13 is fitted into the bottom of the furnace feeder 2, and the bottom means 14 is freely arranged in a throat 15 of the nozzle feeder 12 with a clearance $a$ and a bent thermally insulated tube 16 made of a platinum-rhodium alloy, said tube 15 interconnecting said means 13 and 14.

Each of the said means 13 and 14 in turn comprises a tube 17 made of a platinum-rhodium alloy and enclosed in a current-conducting bushing member 18 and an annular copper current lead members 19 for feeding the means 3 with electric current.

The space between the tube 17 and the current-conducting bushing member 18 is filled with kaolin wool.

The device proposed herein is mounted on the feeder of an installation for producing glass cloth from glass fibers and is the very unit which ensures the obtaining of glass fibers directly from the glass melt.

The operation of the proposed device will become most evident from a consideration of the operation of such an installation.

Properly molten and adequently clarified glass melt is delivered from the exit portion of the bath of the glass furnace 1 (FIG. 1) into the furnace feeder 2.

From the furnace feeder the glass melt, via the tubes 17 (FIG. 2) of the means 13, flows into the tubes 17 of the means 14 through the bent tube 16 and thus gets into the nozzle feeders 12.

Electric current supplied to the bushing members 18 through the current lead members 19 heats the tubes 16 and 17 up to 1300° C., whereby the viscosity of the glass melt supplied into the formation zone through said tubes is maintained as required for glass fiber to be drawn and the formation process to be stable, that is, within $10^{3.2}$ to $10^{3.4}$ poise.

Moreover, by adjusting the intensity of current fed to the bushing members 18 the required amount of the glass melt for forming glass fibers is ensured.

To reduce thermal losses, the bent tube 16 is insulated with kaolin wool 20.

The tube 16 may be of various shapes and lengths, these being selected according to the conditions to be met when mounting the nozzle feeder 12. The above-said circumstance makes it possible to take the glass melt from those portions of the furnace feeder where it proves to be maximum uniform both chemically and thermally.

When travelling along the tubes 16 and 17 made of a platinum-rhodium alloy, the glass melt does not encounter any other materials, its chemical composition does not vary and hence the glass melt supplied to the nozzle feeders 12 is chemically and thermally uniform.

Then the nozzle feeder 12 is filled with the glass melt, the latter overflows into the clearance $a$ and solidifying in the air tightly seals the feeder 12 with the bushing member 18 of the means 14.

From the nozzle feeders 12 the glass melt flows through nozzle orifices 21 in separate streams which are positively drawn into fibers 22 (FIG. 1) of a preset diameter by the mechanisms 5.

The fibers 22 are fed through the filament collectors 4 wherein they are made to form strands 23. The latter are fed into air-operated traversers 6 which, reciprocating along the width of the conveyor 7, place the strands 23 in a uniform layer onto the band of the conveyor 7. From the band thereof the strands placed in several layers one atop the other are delivered along the conveyer 8 into the bath 9 to be impregnated with a binder such as phenolformaldehyde resin for cloth 24 to be obtained. The latter is dried while passing along the conveyer 10. The ready glass cloth is wound as a reel of a preset length by the receiving means 11.

Three means for supplying the glass melt from the feeder of the glass furnace into the glass fiber formation zone are conventionally shown in FIG. 1, their number ensuring the manufacture of the glass cloth from the three layers produced when placing the strands onto the conveyer band.

If required, ten to twenty such devices can be arranged within the length of the feeder as small as, say, 10 metres, which is not only instrumental in increasing the installation efficiency, but also improves the appearance of the glass cloth obtained.

What is claimed is:

1. A device for supplying glass melt from the feeder of a glass furnace into a glass fiber formation zone, comprising a nozzle feeder having a throat somewhat spaced from the bottom of the glass furnace feeder, a thermally insulated metal tube connecting said nozzle feeder with the bottom of said furnace feeder, and at least two electric means for maintaining the glass melt temperature required for shaping glass fibers, each of said means including a metal tube connected with said thermally insulated tube, and a current-conducting bushing member placed onto each of said metal tubes; one of said means being fitted into the bottom of the glass furnace feeder and the other being freely arranged in the throat of said nozzle feeder with a clearance between the said throat and said current-conducting bushing member.

References Cited
UNITED STATES PATENTS

| | | | |
|---|---|---|---|
| 3,285,720 | 11/1966 | Drummond | 65—2X |
| 3,331,673 | 7/1967 | Bour | 65—126X |
| 3,406,021 | 10/1968 | Day et al. | 65—2X |

S. LEON BASHORE, Primary Examiner

R. L. LINDSAY, Jr., Assistant Examiner

U.S. Cl. X.R.

65—128, 326, 356